2,727,872

Patented Dec. 20, 1955

2,727,872

COPOLYMERS OF VINYL ESTERS OF STABILIZED ROSIN ACIDS WITH VINYL ESTERS OF FATTY ACIDS AND PROCESS THEREFOR

Walter S. Ropp, Wilmington, Del., assignor to Hercules Powder Company, Wilmington, Del., a corporation of Delaware No Drawing. Application September 27, 1951,
Serial No. 248,668

14 Claims. (Cl. 260—27)

This invention relates to new polymeric materials and, more particularly, to copolymers of vinyl esters of long chain fatty acids and a vinyl ester of a chemically stabilized rosin acid. It also relates to a process for the preparation thereof.

Copolymers of the vinyl ester of rosin and vinyl esters of fatty acids have been suggested. U. S. 2,118,864, for example, states in its broad disclosure that such copolymers may be formed. No instance of the actual preparation of such a copolymer has been found in the literature, however. One reason is the fact that the vinyl ester of rosin is exceedingly sluggish in polymerization with vinyl esters of fatty acids. Very strenuous polymerization conditions must be used and even then only low yields of low molecular weight compounds are obtained. Moreover, the copolymers of the vinyl ester of rosin with the vinyl esters of fatty acids are characterized by poor color, low solution viscosity, and low tensile strength.

It has now been found unexpectedly that the vinyl esters of a rosin acid wherein the rosin acid radical is stabilized chemically have quite different properties as compared with the vinyl esters of rosin in forming copolymers with the vinyl esters of long chain fatty acids. Chemical stabilization as used herein includes both hydrogenation and dehydrogenation. Both of these treatments as applied to rosin and certain rosin compounds are well known to the art. The vinyl esters of rosin with which this invention is concerned are accordingly the vinyl esters of a hydrogenated rosin acid and the vinyl esters of a dehydrogenated rosin acid.

According to this invention, it has been found that vinyl esters of chemically stabilized rosin acids copolymerize with vinyl esters of long chain fatty acids in the presence of a peroxide catalyst with ease as compared with the related vinyl ester of rosin. When comparatively strong peroxide catalysts are used in conjunction with the vinyl esters of chemically stabilized rosin acids in the preparation of copolymers of the instant invention, exceptionally high yields of polymer are obtained as contrasted with the low yields of polymer resulting when the vinyl ester of rosin is used as one of the monomers. The vinyl esters of at least 80% hydrogenated rosin acids can be copolymerized with the vinyl esters of fatty acids in substantial yield even using comparatively weak peroxide polymerization catalysts such as benzoyl peroxide. When the vinyl ester of rosin is used as one of the monomers, it is practically unaffected by peroxide polymerization catalysts of the type of benzoyl peroxide. Regardless of whether weak or strong polymerization catalysts are used, the copolymers of the invention have substantially higher molecular weights than do copolymers prepared from the vinyl ester of rosin and the vinyl ester of a long chain fatty acid under identical conditions. Other advantageous properties are better color, higher solution viscosity and higher tensile strength.

The fatty acids whose vinyl esters are used in preparing the copolymers of the invention are saturated fatty acids containing from 12 through 18 carbon atoms in the molecule. Instead of vinyl esters of pure acids, vinyl esters of mixtures of fatty acids may be used.

The copolymers of vinyl esters of chemically stabilized rosin acids and vinyl esters of long chain fatty acids are formed by contacting the monomers with a catalyst which produces free radicals. The copolymerization is preferably effected by contacting the desired monomers with a peroxide polymerization catalyst at a suitable temperature. Another procedure is to contact the desired monomers with a free radical-producing compound such as lead tetraethyl, diazoaminobenzene, etc., at a suitable temperature. Another effective procedure involves subjecting the desired monomers to ultraviolet light with or without the use of a suitable activator such as biacetyl, acetone, etc. Still another effective procedure involves merely heating the desired monomers in bulk at a temperature of at least about 200° C.

The following examples illustrate the preparation of the copolymers of vinyl esters of chemically stabilized rosin acids and vinyl esters of long chain fatty acids in accordance with this invention. They should not be considered as limiting the invention, however, but merely as specific embodiments of the broad concept. All parts, percentages, and ratios are by weight unless otherwise specified.

Example 1

Into a glass vessel were measured 75 parts of vinyl stearate, 75 parts of the vinyl ester of 97% hydrogenated rosin and 0.375 parts of benzoyl peroxide. The vessel was alternately evacuated to 15 mm. and pressured to 10 lb. with nitrogen three times to remove air. It was heated at 50° C. for 137 hours. The product was dissolved in 220 parts of benzene and precipitated from 1600 parts of acetone. It was dried at room temperature for two days at 20 mm. Hg absolute pressure and at 0.5 mm. Hg absolute pressure for one hour. The conversion to copolymer was 81%. The product had a drop softening point of 91° C. and the specific viscosity of a 1% solution of the resin in benzene was 0.27.

Example 2

Into a Pyrex glass vessel were placed 20 parts of vinyl stearate and 30 parts of the vinyl ester of a 97% hydrogenated rosin. The vessel was evacuated to 0.1 mm. Hg absolute pressure and sealed in vacuo. It was placed five inches from a 125-watt Hanovia ultraviolet light for 96 hours. The copolymer was dissolved in 105 parts of benzene and precipitated from 800 parts of rapidly stirred acetone. The copolymer was dried by evacuation at room temperature until it did not swell at 1 mm. Hg absolute pressure. The yield of copolymer was 86%. The copolymer had a drop softening point of 120° C. and the specific viscosity of a 1% solution of the copolymer in benzene was 0.46.

A solution of 40% of the copolymer in mineral spirits was prepared containing 1% benzoyl peroxide and 0.014% manganese naphthenate drier (both based on the weight of the copolymer). A film was then cast on a steel panel and the coating was heated in a forced draft at 300° F. for 30 minutes. The coating had a Sward hardness of 52.

An enamel was prepared using the copolymer of this example with titanium dioxide in a 1:1 ratio, the copolymer being dissolved in mineral spirits to give a 40% solution of the resin and 0.01% manganese naphthenate drier and 1% benzoyl peroxide (both based on the weight of the copolymer) were added as catalysts. This enamel was sprayed onto a panel of polished steel. A control panel of polished steel was then sprayed with a commercial enamel used for household appliances, such as refrigerators, having a 1:1 pigment to resin ratio. The control resin used consisted of 65 parts of a coconut oil fatty acid-modified alkyd resin and 35 parts of a triazine-formaldehyde resin marketed by the Rohm & Haas company under the trade name "Uformite MX-61." The panels were baked for 30 minutes at 300° F. in a forced draft oven. Tests of the coatings showed that the coatings laid down from the copolymer of the invention had a Sward hardness of 39, a per cent flexibility greater than 30, and good to very good adhesion. The control had a Sward hardness of 45, a per cent flexibility of less than 3, and an adhesion which rated very poor. Both the control enamel and the instant copolymer enamel gave films which were equivalent in gloss and color. The flexibility of the coatings of this example was determined on a conical mandrel using A. S. T. M. Method D522-41. The conical mandrel method also gave a rough determination of the adhesion of the coating.

Example 3

Into a glass vessel were measured 90 parts of vinyl ester of 97% hydrogenated rosin, 60 parts of vinyl stearate and 0.75 part of benzoyl peroxide. The vinyl stearate used in this example was prepared from Merck triple pressed stearic acid which contains a large proportion of palmitic acid. The vessel was sealed with a cap containing a Buna N liner and then evacuated and pressured with nitrogen as in Example 1. Thereafter, it was heated for 120 hours at 51° C. The copolymer was dissolved in 270 parts of benzene and precipitated from 1060 parts of rapidly stirred ethanol. The copolymer was dried for 24 hours at room temperature in a vacuum desiccator at a pressure of about 1 mm. Hg absolute. The copolymer was further dried at 60° C. and 50 mm. Hg absolute pressure. The conversion to copolymer was 90%. The product had a drop softening point of 101° C. and the specific viscosity of a 1% solution of the copolymer in benzene was 0.46.

Into a lubricating oil free of any additives having a viscosity index of 99.4 and a pour point of 6° F., enough of the copolymer of Example 3 was added to give a 1% solution of the copolymer in oil. The resulting solution had a viscosity index of 119 and a pour point of —2° F. The viscosity index was determined by A. S. T. M. Method D567-41.

Example 4

Into a Pyrex glass vessel were placed 25 parts of vinyl stearate and 25 parts of the vinyl ester of a 97% hydrogenated rosin. The tube was evacuated to 0.1 mm. and sealed in vacuo. It was placed five inches from a 125-watt Hanovia ultraviolet light for 96 hours. The product was dissolved in 90 parts benzene and precipitated from 600 parts of ethanol. The resulting copolymer was dried as in Example 2. The yield of copolymer was 87% while the copolymer had a drop softening point at 99° C. and the specific viscosity of a 1% solution of the copolymer in benzene was 0.50.

Enough of the copolymer was then dissolved in a 180 neutral Pennsylvania oil to give a 2% solution of resin in the oil. The viscosity was found to have increased by 70% over the viscosity of the oil without copolymer present. By comparison, the amount of viscosity increase for the same oil containing a 2% solution of a commercial viscosity index improver was found to be 43%. The commercial viscosity index improver used consisted of a copolymer of styrene with an 8 to 12 carbon olefin, the copolymer being marketed by the Monsanto Chemical Company under the trade name of "Santodex." The viscosity was determined at 100° F. by A. S. T. M. Method D445.

Example 5

Into a glass vessel were measured 40 parts of the vinyl ester of 97% hydrogenated rosin, 60 parts of vinyl stearate and 0.5 part of benzoyl peroxide. The vessel was sealed with a cap containing a Buna N liner and then evacuated and pressured with nitrogen as in Example 1. Thereafter it was heated for 16 hours at 53° C. and then for 6 hours at 80° to 95° C. The copolymer was dissolved in 380 parts of benzene and precipitated from 2400 parts of ethanol. The copolymer was dried as in Example 1. The conversion to copolymer was 81%. The product had a drop softening point of 76° C. and the specific viscosity of a 1% solution of the copolymer in benzene was 0.489.

Example 6

Into a glass vessel were measured 70 parts of the vinyl ester of 97% hydrogenated rosin, 30 parts of vinyl stearate and 0.5 part of benzoyl peroxide. The vessel was sealed with a cap containing a Buna N liner and then evacuated and pressured with nitrogen as in Example 1. Thereafter it was heated for 16 hours at 53° C. and then for 6 hours at 80° to 95° C. The copolymer was dissolved in 260 parts of benzene and precipitated from 1400 parts of ethanol. It was washed with an additional 1200 parts of ethanol. The copolymer was dried as in Example 1. The conversion to copolymer was 84%. The product had a drop softening point of 119.5° C. and the specific viscosity of a 1% solution of the copolymer in benzene was 0.197.

Example 7

Into a glass vessel were measured 80 parts of the vinyl ester of 97% hydrogenated rosin, 20 parts of vinyl stearate and 0.5 part of benzoyl peroxide. The vessel was sealed with a cap containing a Buna N liner and then evacuated and pressured with nitrogen as in Example 1. Thereafter it was heated for 16 hours at 53° C. and then for 6 hours at 80° to 95° C. The copolymer was dissolved in 200 parts of benzene and precipitated from 1500 parts of ethanol. It was washed with 1200 parts of ethanol. The copolymer was dried as in Example 1. The conversion to copolymer was 73%. The product had a drop softening point of 131° C. and the specific viscosity of a 1% solution of the copolymer in benzene was 0.155.

Example 8

Into a glass vessel were measured 90 parts of the vinyl ester of 97% hydrogenated rosin, 10 parts of vinyl stearate and 0.5 part of benzoyl peroxide. The vessel was sealed with a cap containing a Buna N liner and then evacuated and pressured with nitrogen as in Example 1. Thereafter it was heated for 16 hours at 53° C. and then for 6 hours at 80° to 95° C. The copolymer was dissolved in 160 parts of benzene and precipitated from 1300 parts of ethanol and washed with 1200 parts of ethanol. The copolymer was dried as in Example 1. The conversion to copolymer was 80%. The product had a drop softening point of 125.5° C. and the specific viscosity of a 1% solution of the copolymer in benzene was 0.120.

The ratio of the monomers may be varied over a wide range in the preparation of the copolymers in accordance with this invention. While any ratio of monomers may be used, it is preferred to incorporate at least about 20% by weight of either monomer in the copolymer. The preferred copolymers of the invention resemble neither homopolymer. Polymers of the vinyl esters of long chain fatty acids are waxes, while polymers of the vinyl esters of a chemically stabilized rosin are hard, brittle resins. In the copolymers, the resinous nature of the vinyl ester of a chemically stabilized rosin is modified by the plasticizing action of the fatty acid group, and the crystalline nature of the polymer of the vinyl ester of a fatty acid is destroyed by the dissymmetry introduced by the stabilized rosin groups. The resulting copolymers are tacky solids which exhibit some cold flow at room temperature. They are clear and exhibit some elasticity.

With increasing content of the vinyl ester of a long chain fatty acid, the copolymer becomes softer while the specific viscosity and molecular weight both increase As an adhesive the copolymers containing from about 45% to about 55% by weight of the vinyl ester of a long chain fatty acid are preferred as having the best balance of tack and tensile strength. As a surface coating, either pigmented or unpigmented, the copolymers containing from about 35% to about 55% by weight of the vinyl ester of a long chain fatty acid are preferred. The most preferred ratio of monomers for a particular use of the copolymers will vary with the chain length of the fatty acid.

The polymerization may be carried out in bulk, solution, suspension, or emulsion. The catalysts for the reaction are those which produce free radicals. The catalysts may be organic or inorganic peroxides or other free radical producing compounds. Examples of suitable peroxides are benzoyl peroxide, lauroyl peroxide, di-tert-butyl peroxide, acetyl peroxide, cumene hydroperoxide, dicumyl peroxide, tert-butyl perphthalate, and potassium persulfate. Examples of other free radical producing compounds are lead tetraethyl, α,α'-azobisisobutyronitrile, and diazoaminobenzene. These catalysts may be used alone or with so-called activators which accelerate the decomposition of the free radical producing compound. The activators for peroxide decomposition are usually amines or metal compounds. They are used together, alone or with reducing agents. The best activator or activators depend upon the temperature of reaction, the peroxide initiator and the monomers to be polymerized. Examples of these compounds are, for amines, triethanolamine, diethanolamine, n-amyl amine, diethylenetriamine and tetraethylene pentamine; for metal compounds, ferric resinate, cobalt acetylacetonate and cupric acetate; and for reducing agents, sugar and benzoin. The catalyst may be used in the concentrations of from about 0.01 to about 5% by weight. The preferred range for high conversion to soluble polymers is about 0.2 to about 1% by weight. This preferred range, of course, will vary somewhat with the particular catalyst employed.

These catalysts, of course, require different temperatures for maximum effectiveness depending on their rate of decomposition. With benzoyl peroxide the range is 20° to 100° C., with 50° to 80° C. being the preferred range. The practical lower temperature for any catalyst is that at which a satisfactory rate of polymerization is obtained. This is a function of the catalyst or catalyst-activator system employed and changes as the science is advanced. The upper temperature limit of polymerization is the point at which the copolymer decomposes which is circa 275° C. At higher temperatures and catalyst concentrations, gelation occurs, especially in polymers containing appreciable amounts of the vinyl ester of a long chain fatty acid.

Ultraviolet light is quite effective for initiating the polymerization. Activators such as acetone, biacetyl, or di-tert-butyl peroxide which are split into free radicals by ultraviolet light may be used with it. The polymerization may also be carried out by merely heating the desired monomers in bulk at a temperature of at least about 200° C.

The vinyl esters of rosin acids of various degrees of hydrogenation can be used in accordance with this invention. In general, the vinyl esters of any of the prior art hydrogenated rosin acids may be employed. It is preferred, however, to employ the vinyl ester of a hydrogenated rosin acid which is at least 40% saturated with hydrogen and which hydrogenated rosin acid has a content of abietic-type resin acids of not over 10% It is further preferred to use a rosin acid which is at least 80% saturated with hydrogen. A rosin acid which is at least 80% saturated with hydrogen has a content of abietic-type resin acids of substantially zero. The copolymer of the vinyl ester of a long chain fatty acid with the vinyl ester of an at least 80% hydrogenated rosin acid may be prepared in substantial yield with such relatively weak peroxide catalysts as benzoyl peroxide whereas relatively strong peroxide catalysts such as di-tert-butyl peroxide are needed to obtain satisfactory yields when vinyl esters of less highly hydrogenated rosin acids are used. Also, copolymers of the vinyl ester of a long chain fatty acid and the vinyl ester of at least 80% hydrogenated rosin may be obtained which are colorless.

The per cent conversion to polymer and the drop softening point increase with increasing per cent of hydrogenation of the rosin acids. For these reasons it is most preferred to have the rosin as completely hydrogenated as it is commercially feasible to make it.

In describing the invention the term "rosin acid" has been employed. The term "rosin acid" is here used in a generic sense to include both commercial rosins, which are known to contain a neutral body fraction as well as a rosin acid fraction, and the rosin acid fractions obtained therefrom. Thus, there is included wood rosin, gum rosin, and the substantially entirely acidic fractions obtained therefrom as by distillation, combined saponification and extraction processes, etc. It is well known, too, that the acidic fraction contained in wood or gum rosin is a mixture of isomeric resin acids which include abietic, levopimaric, dextropimaric, neoabietic, isodextropimaric, etc., acids. Such specific compounds are equivalent to the naturally occurring mixtures found in wood or gum rosin and the term "rosin acid" is intended to be inclusive thereof. However, from an economical standpoint, the naturally occurring wood or gum rosin or acid fractions thereof are preferred.

The hydrogenated rosin acids employed in accordance with this invention may be made by any of the known procedures for hydrogenating rosin acids. As examples thereof, there may be mentioned the procedures of U. S. 2,094,117 and U. S. 2,155,036. Other procedures which are of interest are those described in U. S. 2,174,651; U. S. 1,973,865; U. S. 2,113,808; and U. S. 2,346,793.

"Per cent saturation with hydrogen" as applied to any particular sample of hydrogenated rosin acid means $$\frac{100\% \times \text{No. of g. of } H_2 \text{ absorbed per 100 g. of the initial rosin acid in preparing the sample}}{\text{No. of g. of } H_2 \text{ absorbed per 100 g. of the initial rosin acid in preparing a completely saturated rosin acid}}$$

A "completely saturated rosin acid" is one prepared under such strenuous conditions of hydrogenation that substantially all of the ethylenic double bonds contained in the starting rosin acid are saturated with hydrogen. The analytical procedure used to effect complete saturation of a rosin acid is described in detail infra.

A substantially completely hydrogenated rosin acid is rather unique in so far as this invention is concerned in that vinyl esters thereof copolymerize with ease to give very high conversions to polymers even in the presence of small amounts of relatively weak peroxide catalysts as benzoyl peroxide.

As stated above, it is preferred that the hydrogenated rosin acid employed have a content of abietic-type resin acids of not over 10%. By "abietic-type resin acids" there is meant the class of resin acids having the carbon skeleton of abietic acid; i. e.,

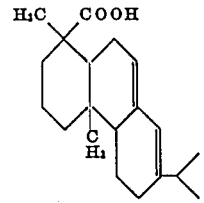

and having two ethylenic double bonds per molecule. Resin acids falling in this class are abietic acid, levopimaric acid and neoabietic acid.

The dehydrogenated rosin acids used in accordance with this invention may be prepared according to known procedures. As exemplary of known procedures of dehydrogenating rosin acids there is mentioned the heating of rosin acid for 1 to 2 hours at 150° C. to 200° C. with a dehydrogenation catalyst such as iodine or sulfur, in the amount of 0.5 to 4% by weight of the rosin acid. Dehydrogenated rosin acids may also be produced by what is known in the art as the "disproportionation" reaction. A disproportionated rosin acid is a rosin acid that has been treated with an active hydrogenation catalyst under conditions of reaction adapted to produce an intra- and inter-molecular rearrangement of the hydrogen atoms in the rosin acids contained therein and in the absence of added substances capable of reducing the unsaturation of the rosin acid under the conditions of treatment. Such disproportionated rosin acids have a substantial proportion of dehydrogenated acidic constituents and are properly regarded as dehydrogenated rosin acids. See in this connection U. S. 2,154,629 to Littmann. Other materials which are properly classed as dehydrogenated rosin acids and which can be used as such in accordance with this invention are pyroabietic acid which is rich in dehydroabietic acid, etc. It may be prepared by heating a rosin acid for 1 to 4 hours at 260° C. to 315° C. The pseudopimaric acid which is described in U. S. 2,072,628 is similarly suitable.

The above described procedures for preparing dehydrogenated rosin acids provide products having a rather wide variety of degrees of dehydrogenation. It will be understood in this connection that the rosin acids present in wood and gum rosin are substantially entirely isomeric compounds possessing the empirical formula $C_{20}H_{30}O_2$. These isomers possess two ethylenic double bonds per molecule. Upon subjection to the known dehydrogenation processes a proportion of the isomeric acids lose two atoms of hydrogen and it is believed that the resulting three ethylenic bonds arrange themselves in the form of the most stable configuration, the benzene ring. Such acids have the empirical formula $C_{20}H_{28}O_2$ and are commonly referred to as "dehydroabietic acid." Obviously, the content of dehydroabietic acid of a dehydrogenated rosin acid is a measure of the degree of dehydrogenation of the original rosin acid.

As explained above, rosin acids having a variety of degrees of dehydrogenation result from the procedures for dehydrogenation described in the art. In general, any of the prior art dehydrogenated rosin acids may be employed in practicing this invention. It is preferred, however, to employ one having a dehydroabietic content of at least 40% and having an abietic-type resin acid content of not over 10%. It is still further preferred to employ a dehydrogenated rosin acid having a content of abietic-type resin acids of substantially 0%.

The uncured copolymers of this invention exhibit excellent tack and adhere to a variety of substances including metals, glass, and polyethylene. Cured coatings of these polymers are flint hard and have excellent color, gloss, adhesion, and flexibility. The copolymers are soluble in paraffin hydrocarbons including those used as lubricants. When added to lubricants they raise the viscosity index considerably and serve to lower the pour point.

The analytical method referred to supra for quantitatively completely hydrogenating a rosin acid is the following. This method effects removal of all unsaturation of the rosin acid existing due to the presence of carbon-carbon double bonds and aromatic nuclei.

The method consists of reducing a suspension of platinum oxide in acetic acid to platinum black in an atmosphere of hydrogen, adding a weighed sample of the rosin acid to the catalyst suspension and measuring the amount of hydrogen absorbed by the rosin acid.

The reagents employed are (1) acetic acid, empyreuma-free (passing dichromate test), (2) platinum oxide catalysts of the type described by Voorhees and Adams, J. A. C. S., 44, 1397 (1922) and by Adams and Shriner, J. A. C. S., 45, 2171 (1923), and (3) commercial hydrogen.

The apparatus employed included a gas measuring buret, a reaction flask, and a magnetic stirrer. The gas buret employed is that described by C. R. Noller and M. R. Barusch, Industrial and Engineering Chemistry, Anal. Ed., Vol. 14, 907 (1942) with the exceptions (1) there is a T and stopcock between the reaction flask (B) and the calibrated section of the buret (A) so that air may be removed and hydrogen admitted by alternate evacuation and filling and (2) there is a 25 ml. reservoir just below the calibrations of said section. The reaction flask employed is similar to that of Noller et al. except that in place of the side arm with cup it has a side arm fitted with a ground glass stopper. The stopper end (within the flask) is so made as to permit a sample cup placed thereon to drop to the bottom of the flask when the stopper handle is turned 90 degrees.

Remove the side arm of the reaction flask and weigh in $0.10 \pm 0.01$ g. PtO catalyst. Add a glass-encased iron wire and wash the catalyst into the flask with 5 ml. acetic acid. Grease the upper half of the ground joint on the side arm and insert in flask. Weight the sample of rosin acid (0.15–0.20 g.) to the nearest 0.0001 g. into a 9 x 15 mm. sample cup. If the sample is a powdered solid, moisten with a drop of acetic acid. Place the sample cup in the neck of the flask where it is supported by the end of the stopper. Connect the flask to the gas buret using a thin film of grease on the ground glass joint, evacuate the apparatus and fill the same with hydrogen. Repeat the evacuation and filling cycle four times. The final filling with hydrogen should almost completely fill the reservoir at the base of the buret. When this condition is reached, the flow of hydrogen into the buret is stopped by closing the proper stopcocks.

A magnetic stirrer is placed below the reaction flask and started. The speed is regulated so that stirring is just sufficiently vigorous to break the liquid surface. At this point reduction of the catalyst starts. When the catalyst is completely reduced to platinum black as evidenced by no further change in the mercury level (this requires about 1 hour), the mercury surfaces in the buret are leveled using the mercury reservoir. This condition of complete reduction is determined by reading the leveled mercury volume at 30-minute intervals until the volume is constant within 0.1 ml.

When complete reduction of the PtO has been achieved, record the gas volume, temperature, and barometric pressure. The gas volume at this point should not be more than 45 ml. Rotate the side arm so as to allow the sample cup to drop into the acetic acid solution. Permit hydrogenation to proceed for about 16 hours. Read the final gas volume, temperature, and pressure. Temperature is read to the nearest 0.1° C. and the pressure to the nearest 1 mm. Correct the initial and final gas volumes to standard conditions, first adding the volume of the uncalibrated system.

$$\frac{(\text{Corrected initial volume} - \text{corrected final volume}) \, 0.00900}{\text{Grams of sample}} = \% \, H_2 \, \text{absorbed}$$

What I claim and desire to protect by Letters Patent is:

1. A copolymer of a vinyl ester of a saturated fatty acid containing from 12 to 18 carbon atoms in the molecule and a vinyl ester of a chemically stabilized rosin acid, said chemically stabilized rosin acid being selected from the group consisting of hydrogenated rosin acid and dehydrogenated rosin acids and said chemically stabilized rosin acid containing not more than 10% of rosin acids having the carbon skeleton of abietic acid and having two ethylenic double bonds per molecule.

2. The copolymer of claim 1 in which the vinyl ester of a chemically stabilized rosin acid is a vinyl ester of a hydrogenated rosin acid.

3. A copolymer of claim 1 in which the vinyl ester of a chemically stabilized rosin acid is a vinyl ester of a dehydrogenated rosin acid.

4. The copolymer of claim 2 in which the hydrogenated rosin acid is at least 80% hydrogenated and contains substantially no resin acids having the carbon skeleton of abietic acid and having two ethylenic double bonds per molecule.

5. The copolymer of claim 4 in which the vinyl ester of a saturated fatty acid is vinyl stearate.

6. The process for copolymerizing a vinyl ester of a saturated fatty acid containing from 12 to 18 carbon atoms and a vinyl ester of a chemically stabilized rosin acid, said chemically stabilized rosin acid being selected from the group of hydrogenated rosin acids and dehydrogenated rosin acids and containing not more than 10% of resin acids having the carbon skeleton of abietic acid and having two ethylenic double bonds per molecule, which comprises reacting both said vinyl esters in the presence of a free radical producing catalyst.

7. The process of claim 6 in which the vinyl ester of a chemically stabilized rosin acid is a vinyl ester of a hydrogenated rosin acid.

8. The process of claim 6 in which the vinyl ester of a chemically stabilized rosin acid is a vinyl ester of a dehydrogenated rosin acid.

9. The process of claim 7 in which said hydrogenated rosin acid is at least 80% saturated and contains substantially no resin acids having the carbon skeleton of abietic acid and having two ethylenic double bonds per molecule.

10. The process of claim 9 in which the vinyl ester of a saturated fatty acid is vinyl stearate.

11. The process of claim 9 in which the free radical producing catalyst is a peroxide polymerization catalyst.

12. The process of claim 9 in which said esters are subjected to ultraviolet radiation.

13. The process of claim 9 in which said esters are subjected to ultraviolet radiation in the presence of an activator selected from the group consisting of acetone, biacetyl, and di-tert-butyl peroxide.

14. The process of claim 9 in which the free radical producing compound is selected from the group consisting of lead tetraethyl, $\alpha,\alpha'$-azobisisobutyronitrile and diazoaminobenzene.

References Cited in the file of this patent

UNITED STATES PATENTS

| | | |
|---|---|---|
| 2,118,864 | Reppe | May 31, 1938 |
| 2,614,997 | Robinson | Oct. 21, 1952 |
| 2,639,273 | Gould | May 19, 1953 |

FOREIGN PATENTS

| | | |
|---|---|---|
| 395,478 | Great Britain | July 20, 1933 |

OTHER REFERENCES

Fleck et al.: J. Am. Chem. Soc., 61, 1230–1232 (May 1939).